OR 4,008,948

United States Patent
Dalgleish et al

[11] 4,008,948
[45] Feb. 22, 1977

[54] OPTICAL FIBRE CONNECTORS

[75] Inventors: Jack Frank Dalgleish, Ottawa; Helmut Hans Lukas, Carleton Place; Louis Donald Charron, Greely, all of Canada

[73] Assignee: Northern Telecom Limited, Montreal, Canada

[22] Filed: Apr. 5, 1976

[21] Appl. No.: 673,369

Related U.S. Application Data

[63] Continuation-in-part of Ser. No. 591,499, June 30, 1975, abandoned.

[52] U.S. Cl. .................................................. 350/96 C
[51] Int. Cl.² ........................................... G02B 5/14
[58] Field of Search ............ 350/96 C, 96 B, 96 BC

[56] References Cited
UNITED STATES PATENTS

| | | | |
|---|---|---|---|
| 3,504,984 | 4/1970 | Bush | 350/96 C |
| 3,861,781 | 1/1975 | Hasegawa et al. | 350/96 C |
| 3,948,582 | 4/1976 | Martin | 350/96 C |

*Primary Examiner*—John K. Corbin
*Assistant Examiner*—Stewart Levy
*Attorney, Agent, or Firm*—Sidney T. Jelly

[57] ABSTRACT

A connector for optical fibres comprises two subassemblies, one subassembly comprising at least one tubular member the rear part of which fits on a coated fibre and the front part of which receives a connector element. The other subassembly includes at least one tubular connector element, the rear part of which fits on a coated fibre and the front part of which is a close fit on an uncoated fibre. On assembly of the two subassemblies, the connector element slides into the front part of the tubular member of the first subassembly. The ends of the uncoated fibres abut at about a mid position in the connector element. For a connector for multiple pairs of fibres, a plurality of tubular members are provided in one subassembly and a plurality of connector elements in the other assembly. Means can be provided for resiliently positioning one or the other or both of the tubular members and connector elements axially to permit axial movement on assembly to allow for manufacturing tolerances.

15 Claims, 17 Drawing Figures

OPTICAL FIBRE CONNECTORS

This application is a continuation-in-part of application Ser. No. 591,499, filed June 30, 1975, now abandoned.

This invention relates to optical fibre connectors and particularly to connectors for optical fibres used in communication systems.

Connections between optical fibres should provide easy and quick connection, disconnection and reconnection of optical fibres in accurate radial and end to end alignment. Accurate alignment is necessary to ensure high connection efficiency.

Generally, in accordance with the present invention, a connector comprises first and second subassemblies, the first subassembly comprising at least one tubular member having a bore at a rear portion which is a close sliding fit on a coated fibre and a bore at a forward portion which receives a connector element in the second subassembly, the second subassembly including at least one tubular connector element having a bore at a rear portion which is a close sliding fit on a coated fibre and a bore at a forward portion which is a close sliding fit on an uncoated fibre, and a divergent surface at each end of the bore in the forward portion, and with means for retaining the subassemblies in assembled position with the connector element extending into the bore in the forward portion of the tubular element. When assembled as a connector, the ends of the uncoated fibres are in end to end relationship at a position approximately at the mid portion of the bore in the forward portion of the connector element.

The invention also provides a connector for simultaneously connecting a plurality of pairs of optical fibres, the connector including first and second subassemblies, the first subassembly comprising a housing and a plurality of tubular members therein, each tubular member having a rear bore which is a close sliding fit on a coated fibre and a forward bore which receives a connector element of the second subassembly, the second subassembly comprising a housing and a plurality of tubular connector elements therein, each connector element having a rear bore which is a close sliding fit on a coated fibre, a forward bore which is a close sliding fit on an uncoated fibre and a divergent surface at each end of the forward bore, the internal size of each connector element such that each element is a close sliding fit in the forward bore of a tubular member of the first subassembly, means for releasably retaining the tubular members and the connector elements in the related housing and means for releasably retaining the first and second subassemblies in cooperating assembled position with each connector element in a related forward bore of a tubular member, such that ends of uncoated fibres are in end to end relationship at a position approximately in a mid portion of the forward bores of the connector elements.

The present invention provides a connector which is small, has a minimum of parts and provides efficient coupling or connecting. Accuracy under several disconnects and reconnects is maintained. Protection is afforded to the ends of the fibres when the connector is apart.

These and other advantages will be evident from the following description of certain embodiments, by way of example, in conjunction with the accompanying drawings, in which:

FIGS. 1 to 5 illustrate one form of connector for connecting a single pair of optical fibres, and which, by way of example, is also adapted for bulkhead mounting. The connector comprises two main parts or subassemblies — a male member 10 and a female member 11. Considering first the female member 11, this comprises a tubular member having an enlarged rear portion 12. A peripheral recess 13 is formed on a forward face of the portion 12, of a size to enable the portion 12 to fit into a hole 14 in a bulkhead 15. The part 11 is held in position in the bulkhead by a nut 16 screwed on to an axial extension 17. A washer 18 is positioned between the nut 16 and the bulkhead 15.

Figure 1:
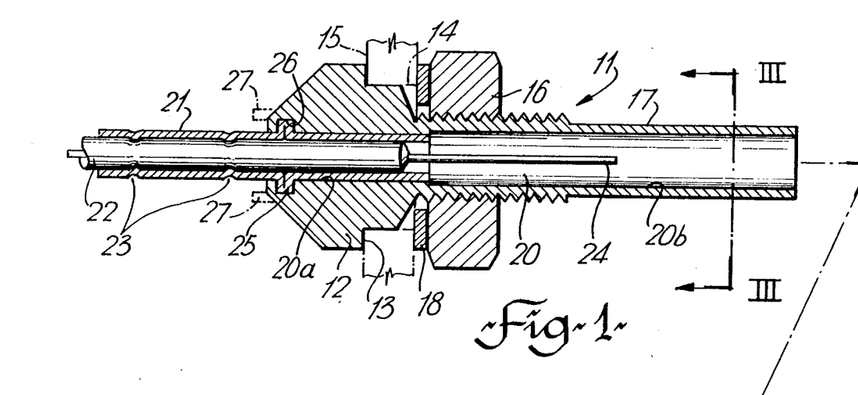
FIGS. 1 and 2 are longitudinal cross-sections through two cooperating parts for a connector for a single pair of fibres.

Extending through the female member 11 is an axial bore 20. Bore 20 has two portions, a rear portion 20a which is a close fit on the outside of a first connecting element 21 crimped on to a coated optical fibre 22, and a front portion 20b for reception of a second connecting element which is the male part 10. In the present example portion 20b is slightly larger in diameter than portion 20a.

The first connecting element 21 is a thin walled metal tube crimped onto the coated fibre 22 by crimps indicated at 23. The element 21 has a flange 25 formed at a position intermediate its ends. The flange 25 fits into a recess 26 in the rear of the enlarged portion 12. After insertion of the element 21 into the female member 11 the rear of the enlarged portion is deformed to enclose the flange, as seen in FIG. 1. The shape of the enlarged portion prior to deforming is illustrated at 27. The element 21 is inserted into the female member 11 before inserting coated fibre 22.

Prior to inserting coated fibre 22, the coating is removed from the end for a predetermined distance to expose the fibre 24. The end of the fibre is then prepared by a suitable technique to provide a smooth flat end surface, perpendicular to the axis of the fibre. The coated fibre is inserted into the connecting element 21 a predetermined distance to locate the end of the exposed fibre at a desired position. The connecting element 21 is then crimped on to the coated fibre. The exposed fibre 24 is protected by the axial extension 17.

Figure 2:
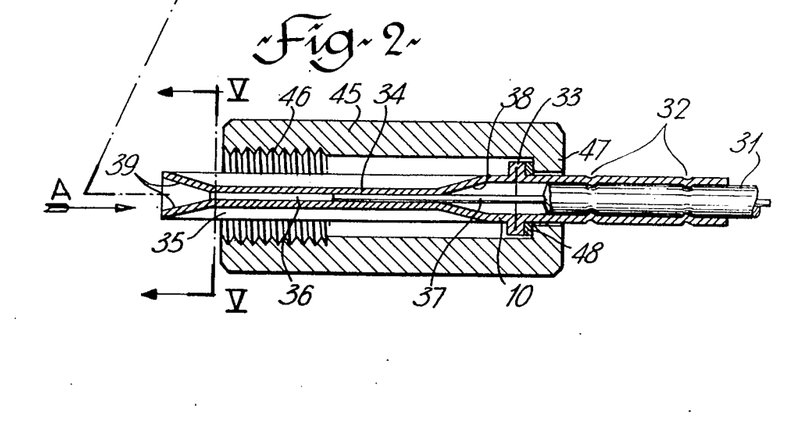
Figure 3:
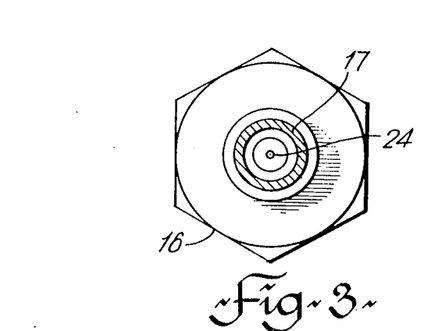
FIG. 3 is a cross-section on the line III—III of FIG. 1.
Figure 4:
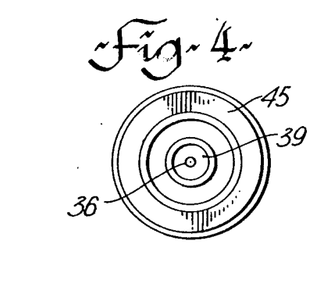
FIG. 4 is an end view in the direction of arrow A in FIG. 2.
Figure 5:
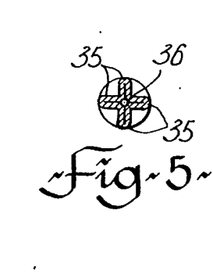
FIG. 5 is a cross-section on the line V—V of FIG. 2.

The male member 10, forming the second connecting element, is a thin walled metal tube. The element is crimped onto a coated optical fibre 31, at 32, at its rear end. The element also has a flange 33 formed at an intermediate position. The forward portion of the male member 10 is preformed — at 34 — to give a cross-section comprising a plurality of lobes 35 and a central bore 36. The bore 36 is a fairly close sliding fit in fibre 24 and also on fibre 37 of coated fibre 31. Prior to insertion of the coated fibre 31 into the male member 10 the coating is removed for a predetermined length to expose the fibre 37. Again, the fibre end is prepared by a suitable technique to provide a smooth, flat end surface, perpendicular to the axis of the fibre. As the coated fibre 31 is inserted into the rear end of the male member, the fibre 37 is guided into the bore 36 by the inclined ends 38 of the lobes 35. The form of the preformed portion 34, and a method of forming the portion and the crimping technique used on the elements 10 and 21 are described in copending application Ser. No. 549,661, filed Feb. 13, 1975, now U.S. Pat. No. 3,972,585, in the name of the present assignee.

A connection is made by inserting the preformed forward portion 34 into the bore 20b of the axial extension 17 of the female member 11. The portion 34 is a close sliding fit over the lobes 35 in the bore portion 20b. As the male member 10 moves into engagement with the female member 11, the end of fibre 24 is guided into the bore 36 of the preformed portion 34 by the divergent surfaces formed by the inclined ends 39 of the lobes 35.

Figure 6:
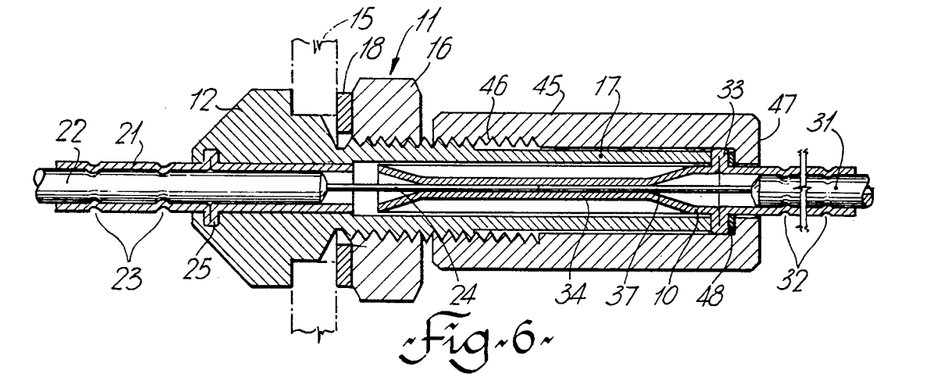
FIG. 6 is a longitudinal cross-section through an assembled connector comprised of parts as in FIGS. 1 to 5.

The assembled connector is illustrated in FIG. 6. It will be seen that the flange 33 on the male member 10 abuts the inner end of the axial extension 17 of the female member 11. Also the ends of the fibres 24 and 37 abut in the bore 36 of the preformed section 34. The male member 10 is held in engagement with the female member 11 by a nut 45 having a threaded forward end 46 which screws on to the threaded portion of the axial extension 17. An inwardly extending flange 47 at the rear end of the nut 45 engages with the flange 33 on the male member. A lockwasher 48 can be provided, if desired.

Figure 6A:
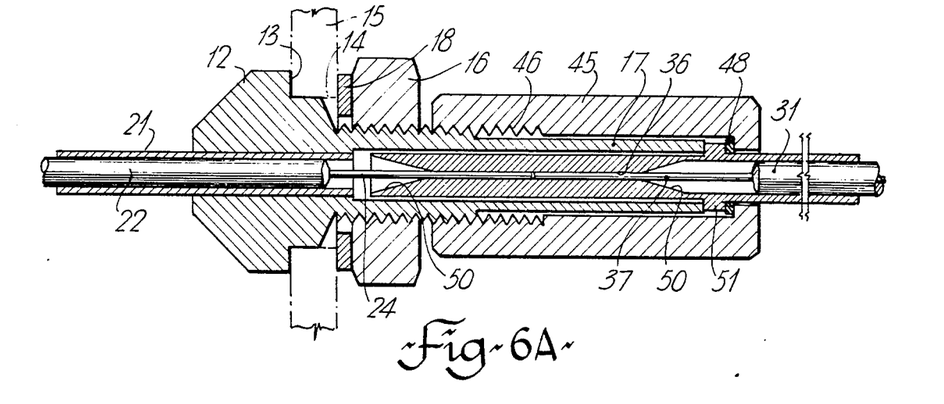
FIG. 6A is a cross-section similar to that of FIG. 6, but illustrating minor modifications.

FIG. 6A illustrates an assembled connector, similar to that of FIGS. 1 to 6, but illustrating minor modifications to the connecting elements. The first connecting element 21, instead of being crimped on to the coated fibre 22, is attached thereto by other means, such as by adhesive, bonding and the like. The element 21 is also retained in the female member 11 by adhesive, brazing, soldering or other means.

The second element and male element 10 is for example machined from bar material, to give the central bore 36 but without forming. The ends of the bore are tapered or inclined, at 50, similarly to the inclined ends 38 and 39 of the preformed section 34 of FIGS. 2 and 6. A flange 51 is also machined or otherwise formed on the male member 10. The coated fibre is retained in the male member by adhesive, bonding or other means.

FIGS. 7 to 10 illustrate a connector for connecting a plurality of pairs of optical fibres either a number of inclined coated fibres or a cable composed of coated fibres. Particularly, as illustrated, the connector comprises a first subassembly 60, for attachment to the end of a cable 61 having a plurality of optical fibres, and a second subassembly 62 for attachment to a further cable — not shown.

Figures 7, 9, 16:
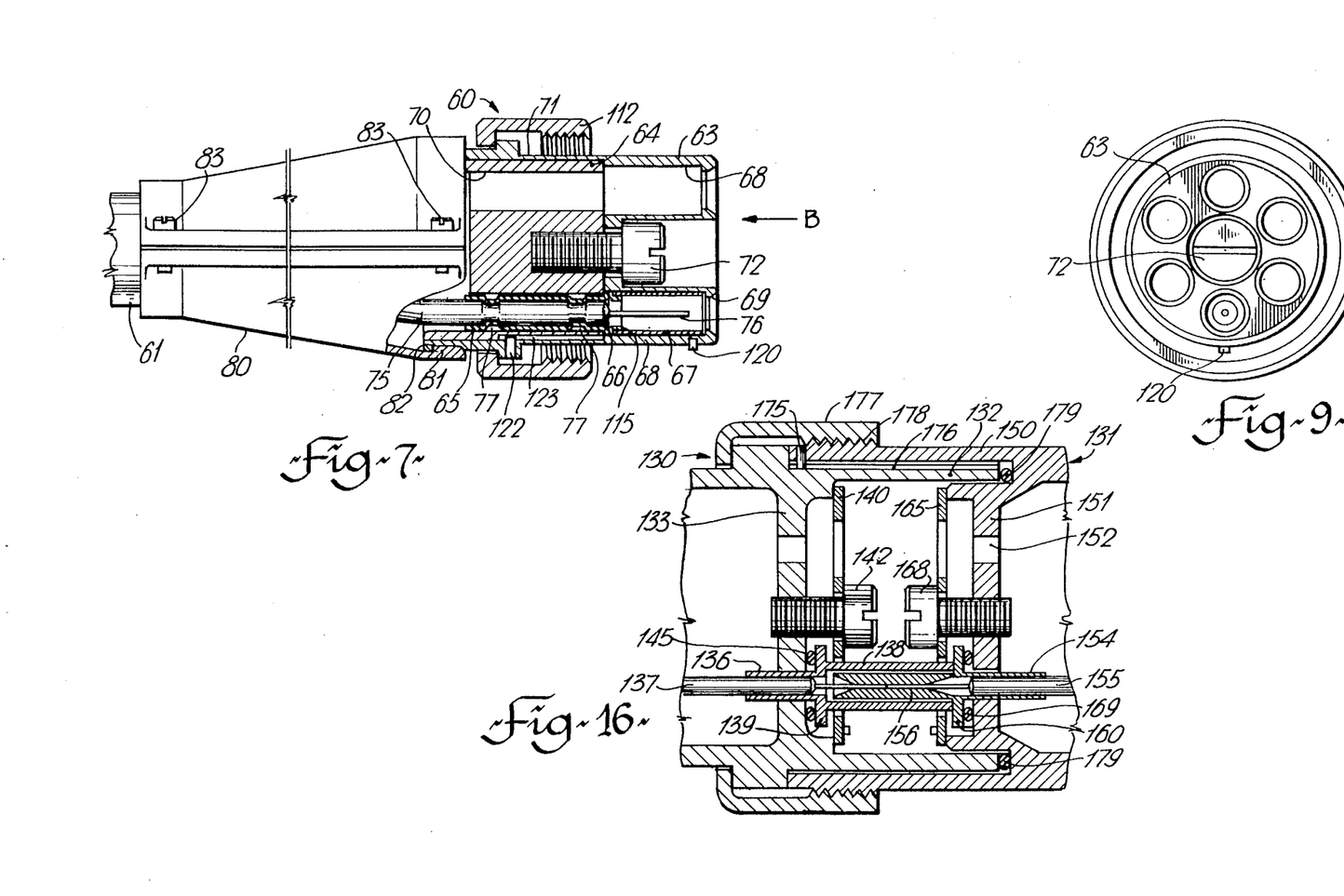
FIGS. 7 and 8 are longitudinal cross-sections through two cooperating parts for another form of connector, for connecting a multiplicity of pairs of fibres.
FIGS. 9 and 10 are end views in the directions of arrows B and C of FIGS. 7 and 8 respectively.
FIG. 16 is a longitudinal cross-section through an assembled connector comprising parts as in FIGS. 12 to 15.

The first subassembly is illustrated in FIGS. 7 and 9 and comprises a housing 63, retaining member 64 and a plurality of tubular connector elements 65. The connector elements 65 are thin walled metal tubes, having a flange 66 formed at a forward end. A sleeve 67 fits on to the extreme forward end of the element 65. Sleeves 67 are a close sliding fit in bores 68 in the housing 63. The bores 68 are reduced in diameter at a forward end, at 69, to provide abutments for the sleeves 67.

The retaining member 64 has a plurality of bores 70, aligned with bores 68 in the housing 63, and of a diameter to readily accept the connecting members 65. The retaining member fits inside an axially extending skirt 71 on the housing 63, and the retaining member and housing are fastened together by a screw 72.

For assembly of the first subassembly to the cable, the sheathing of the cable is stripped to expose the individual coated fibres 75. The fibres are fed through the retaining member 64. The coating on the ends of the fibres is removed for a predetermined distance to expose the fibres 76, and the ends of the fibres are prepared to provide smooth, flat perpendicular end surfaces. The connector elements are positioned on the coated fibres, and crimped onto the coated fibres, at 77. The sleeves 67 are fitted on to the ends of the connector elements and protect the exposed fibres 76. The sleeves are preferably attached before the fibres are inserted into the connector elements. After attachment of the connector elements they are inserted into the bores 68 of the housing 63, the retaining member 64 is moved axially into engagement with the housing and the two parts fastened by the screw 72. The sleeves 67 and the flanges 66 of the connector elements are in engagement and held between the abutments 69 and the forward face of the retaining member 64.

A split housing 80 is attached to the rear of the retaining member 64, the split housing having an inwardly projecting rib 81 at its forward end which sits in a cooperating peripheral recess 82 in the retaining member 64. At its rearward end the split housing 80 clamps onto the sheathing of the cable 61. The two halves of the split housing are held together by screws 83.

Figures 8, 10, 14:
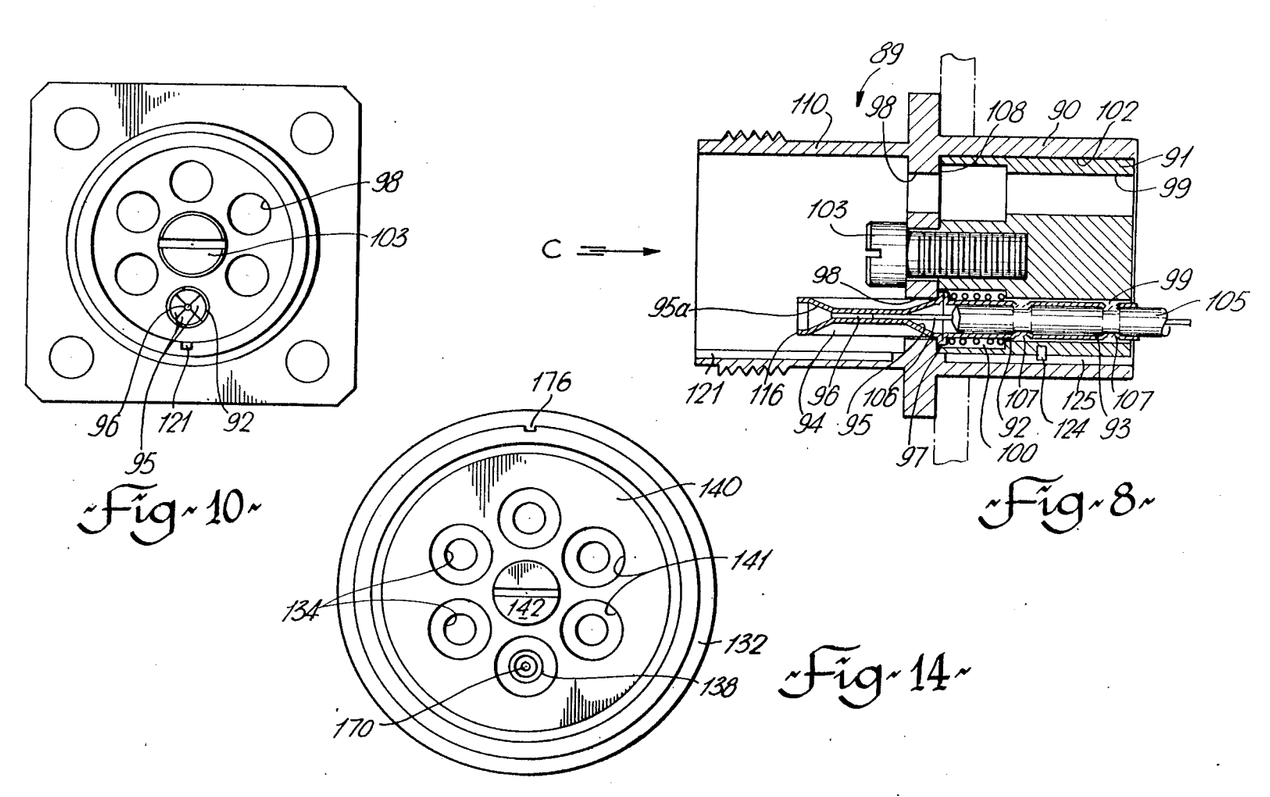
FIGS. 14 and 15 are end views in the directions of arrows D and E of FIGS. 12 and 13 respectively.

The second subassembly 89 is illustrated in FIGS. 8 and 10, and comprises a housing 90, a retaining member 91 and a plurality of tubular connector elements 92. The connector elements 92 are thin walled tubes, very similar to the elements 10 in FIG. 2. Each element 92 comprises a rear portion 93 and a forward preform portion 94. Portion 94 is formed to give four lobes as at 35 in FIG. 5, with inclined ends, or divergent surfaces, 95 and 95a, and a central bore 96. A flange 97 is formed rearward of the preformed portion 94.

The forward, preformed portion 94 of the connector elements 92, fit in bores 98 in the housing member 90. The rear portions 93 of the connector elements 92 fit into bores 99 in the retaining member 91. The bores 99 are enlarged at their forward ends, at 100, for reception of the flanges 97 and compression springs 101. The retaining member 91 is a close sliding fit in a bore 102 in the housing 90. The housing and retaining member are held together by a screw 103. To assemble the second subassembly the sheathing of the cable (not shown) is stripped to expose the individual coated fibres 105. The retaining member is fed over the ends of the coated fibres and then the coating is stripped from the ends of the fibres 105 for a predetermined length, exposing the fibres 106. The ends of the fibres are prepared, as previously described. The connector elements 92 are slid on to the fibres, the rear portions 93 over the coating, and the elements crimped into position — as at 107. As a fibre 106 enters a connector element, it is guided into the central bore 96 by the inclined end 95. The end of the optical fibre is finally positioned approximately midway along the bore 96. A spring 101 is positioned on the rearward portion 93 of each element 92 prior to positioning on the coated fibre.

The housing is then assembled to the retaining member with the preformed portions 94 of the connector elements 92 in the bores 98. The screws 103 then fastens the housing and retaining member together. As housing and retaining members are assembled together the end face 108 of the bore 102 engages with the flanges 97 and partially comprises the springs 101.

Figure 11:
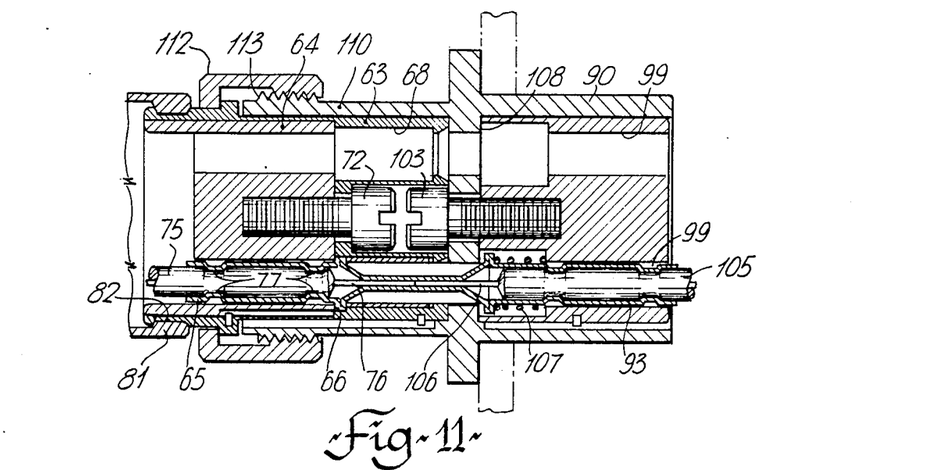
FIG. 11 is a longitudinal cross-section through an assembled connector comprising parts as in FIGS. 7 to 10.

The two subassemblies are assembled together by sliding the housing 63 of first subassembly 60 into a forwardly extending annular extension 110 on the housing 90 of the second subassembly. The outside diameter of the housing 63 is a fairly close sliding fit in the bore of the annular extension 110. The assembly is illustrated in FIG. 11. The two subassemblies are held together by a nut 112 on the retaining member of the first subassembly, screwing on to a threaded forward portion 113 on the annular extension 110.

When the two subassemblies 60 and 89 are assembled, the end faces 115 of the connector elements 65 of the first subassembly and the end faces 116 of the connector elements 92 of the second subassembly act as datum or reference surfaces and are in contact when the two subassemblies are in complete assembly. It is arranged that contact between the reference surfaces 115 and 116 occurs slightly before complete assembly and thus the compression springs 101 are slightly further compressed, as illustrated in FIG. 11. This enables reasonable manufacturing tolerances to be permitted during manufacture of the various items. Also, should any slight endwise movement of a fibre occur, due to some strain on a coated fibre or on a cable, this can be accommodated, without the ends of the fibres moving apart. Close end to end positioning of the fibre ends is necessary for efficient light coupling.

To ensure correct alignment between the two subassemblies, a pin 120 at the forward end of housing 63 slides in a groove 121 in the bore of the annular extension 110 of housing 90. Similarly, to ensure alignment between housing and retaining member in each subassembly, a pin 122 in the housing 63 slides in a groove 123 in retaining member 64, and a pin 124 in retaining member 91 slides in a groove 125 in housing 90.

FIGS. 13 to 16 illustrate a further form of connector for multiple pairs of optical fibres, and comprising two subassemblies 130 and 131. Considering first the first subassembly 130, this comprises a housing 132 of tubular form with a web 133 extending across the bore of the housing at a position intermediate the ends of the housing. The web 133 has a plurality of bores 134 for the reception of a plurality of connector elements 135.

Figures 12, 13, 15:
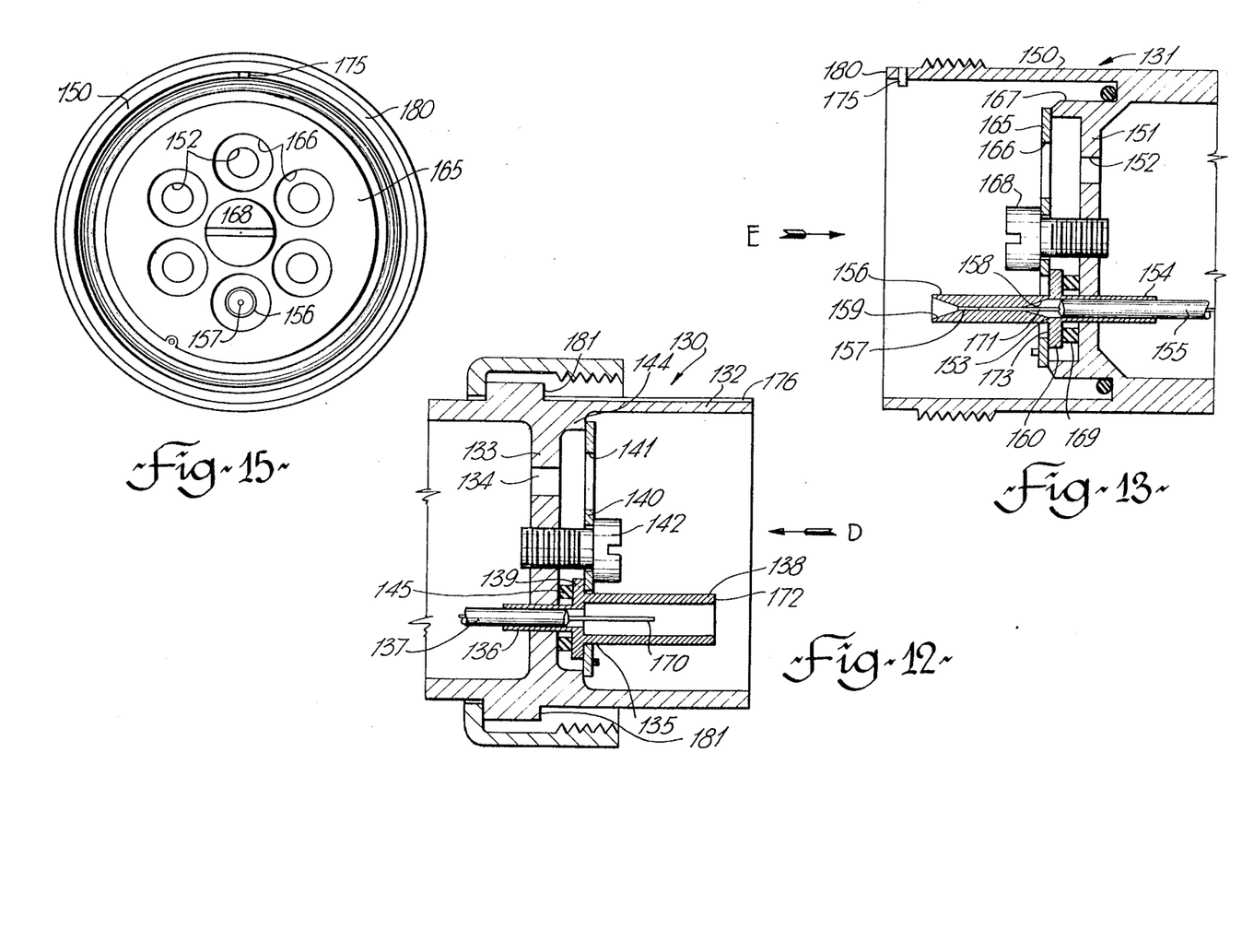
FIGS. 12 and 13 are longitudinal cross-sections through two cooperating parts for a further form of connector, for connecting a multiplicity of pairs of fibres.

The connector elements 135 are tubular, each having a rear portion 136 which is a close fit on the coating of a coated optical fibre 137, and a front portion 138 having a slightly larger bore than the rear portion. A radial flange 139 is provided approximately at the junction of the front and rear portions 138 and 136. The rear portions 136 are a fairly close sliding fit in the bores 134. A retaining member 140, in the form of a flat plate, has a plurality of holes 141 which are a clearance fit over the front portions 138 of the connector elements 135. The retaining member abuts against the flanges 139 on the connector elements, and is held in place by a screw 142. The periphery of the retaining member 140 also abuts against an annular projection 144 on the web 133. Positioned between each flange 139 on the connector elements 135 and the web 133 is a resilient member 145. Resilient members 145 are slightly deformed when the screw 142 is tightened.

The second subassembly 131 — FIGS. 13 and 15 — comprises a housing 150 which is tubular and has a web 151 extending across its bore at a position intermediate its ends. Web 151 has a plurality of holes 152 for reception of connecting elements 153. Connecting elements 153 each have a rear portion 154 which is a close sliding fit on a coated fibre 155, and a front portion 156 which has a small central bore 157 and divergent surfaces 158 and 159 at each end of the bore 157. A radial flange 160 is formed at the junction of the front and rear portions. The rear portions 154 are a fairly close sliding fit in the holes 152.

A retaining member 165, in the form of a flat plate, has a plurality of holes 166, the holes a clearance fit over the front portion 156 of the connecting elements 153. The retaining member 165 abuts against the flanges 160 on the connector elements and also against an annular abutment 167 on the web 151. A screw 168 holds the retaining member 165 in position. A resilient member 169 is positioned between each flange 160 and the web 151 and as the screw 168 is tightened the resilient members 169 are slightly deformed.

In the subassemblies of FIGS. 12 and 14 and of FIGS. 13 and 15, the coated fibres are inserted through the housings prior to attachment of the connector elements. Thus for the first subassembly 130, the coated fibres 137 are inserted through the bores 134. A predetermined length of coating is removed from each coated fibre to expose the fibres 170. The ends of the fibres are prepared as previously described. The connector elements 135 are then pushed on to the fibres, the portions 136 in engagement with the coating. Attachment can be by adhesive, bonding, or similar methods. The fibres 170 extend partway along the bores of the portions 138 of the connector elements 135 and are protected thereby. In the second subassembly 131, the coated fibres 155 are fed through the bores 152 and then a predetermined length of coating removed to expose fibres 171, the fibre ends being prepared as described previously. The connector elements 153 are applied, with the portions 154 fitting over the coating. Attachment is by adhesive, bonding or the like. As the fibres 171 pass into the connector elements 153 they are guided by the divergent surfaces 158 into the central bores 157. The ends of the fibres are arranged to be positioned approximately at a central position along the central bores 157. After attachment of the connector elements 135 and 153 to the coated fibres 137 and 155, the retaining members 140 and 165 are applied and fastened by the screws 142 and 168. The datum surfaces for the two subassemblies are the end surfaces 172 on the forward portions 138 of connector elements 135 and the forward faces 173 of the flanges 160 of the connector elements 153.

The assembled connector is illustrated in FIG. 16. The forward part of housing 132 of the first subassembly 130 slides inside the forward part of housing 150 of the second subassembly 131. To ensure correct alignment between the two housings, and thus the two subassemblies, a pin 175 extending radially inward in the forward part of housing 150 engages with a longitudinal slot or groove 176 in the external surface of the forward part of housing 132. The two subassemblies are held together by a nut 177 on the first subassembly 130 which screws on a threaded portion 178 on the second subassembly 131. Contact between end surface 180 on subassembly 131 and the forward face 181 on subassembly 130 ensures that overtightening of the nut 177 cannot occur and thus avoids possible damage to the connecting elements or resilient members. To seal between the two subassemblies a sealing ring 179 is positioned in the housing 150 and is engaged by the housing 132. As the two subassemblies are brought together, the datum surfaces 172 and 173, on the connector elements 135 and 153, contact each other, and final tightening of the nut 177 produces further slight distortion of the resilient members 145 and 169. There is thus provision for manufacturing tolerances and also provision for accepting some slight axial movement of a connector element due to strain on a fibre, without causing the abutting ends of the fibres 170 and 171 to move apart.

The various embodiments described include differing forms of construction which can be adapted from one connector to another. For example, in the embodiment illustrated in FIGS. 1 to 6 and FIGS. 7 to 11, connector elements having preformed portions have been used, while in the embodiment of FIGS. 12 to 16 machined or otherwise formed connector elements have been used. The form of connector elements in FIGS. 1 to 11 can be used in the embodiment of FIGS. 12 to 16 and vice-versa.

In the embodiment of FIGS. 7 to 11 a spring 107 has been used. Any other form of resilient member can be used, as for example an O-ring, such as illustrated in the embodiment of FIGS. 12 to 16. Other possibilities are spring washers, conical washers and similar devices.

In all instances an index matching liquid can be used between the abutting ends of the fibres to eliminate any air gap. The liquid will also act as a lubricant between fibre and connecting element.

Other forms of connecting together two subassemblies can be used as an alternative to the screwed fastening by nuts as in FIGS. 11 and 16.

The fibres are prepared for connection by removing the coating and then preparing the fibre ends as described earlier. A mounting device is used when assembling a connector element to a coated fibre to ensure that the end of the fibre is correctly positioned relative to a datum surface.

It is not necessarily essential to use resilient members in both subassemblies of the embodiment of FIGS. 12 to 16. Resilient members can be used in only one subassembly. The resilient members provide for manufacturing tolerances, strain on a fibre etc.

In the embodiments illustrated, for connecting multiple pairs of optical fibres, six pairs arranged in a circle about the connector axis have been shown. It will be appreciated that a smaller or larger number of pairs can be connected. Also other arrangements than a circle can be used, for example a linear arrangement, the fibre pairs side by side; a multilinear arrangement; a series of concentric circles; and other arrangements. Because the connection of each fibre is achieved independently of the others, spare holes may be provided without affecting the efficiency of the connections.

The present invention provides for the efficient connection of individual pairs of optical fibres, with accurate radial and end-to-end alignment of the prepared fibre ends. As described, the ends of the fibres are prepared to provide smooth, flat surfaces perpendicular to the axes of the fibres. As described in the various embodiments an optical fibre has a plastic coating — for protection against accidental damage to improve fibre strength and handling characteristics. However other forms of coated fibre can be connected.

In optical fibre communication systems it is necessary, as with other cabled communications systems, to be able to connect lengths of cable to one another and to equipment packages. In many applications it is necessary to be able to repeatedly connect and disconnect cables quickly and easily. The present invention provides this facility.

When single fibres are to be releasably connected, a single fibre connector is required. For optical fibre cables containing a plurality of fibres, with each fibre a separate communications channel, a connector is required which will simultaneously connect each fibre in one cable with its related fibre in another cable or plurality of fibres with high efficiency. To achieve high coupling efficiency in a multiple connector without requiring extremely accurate — and impractical — dimension tolerances on connector parts, it is necessary to have each fibre to fibre coupling unit in a connector performing independently. The present invention provides for such individual coupling in a multiple coupling connector. Thus, in the present invention each fibre is mounted individually in the connector housing and the efficiency achieved for a single fibre-to-fibre connection is equally achievable when a number of fibre-to-fibre connections are made simultaneously. As fibres are mounted individually and pairs are connected independently, the connectors can be designed to accommodate the simultaneous connection of any number of single fibres.

Therefore connections can readily be made, broken and remade as the connection between a pair of fibres is independent of connections between other fibres, by means of the resilient members provided. Each pair of fibres is independent, with independent provision for manufacturing tolerances and any strain applied to a fibre.

As herein described, flanges are formed on one or both of the elements comprising a connection pair. That is, as illustrated in FIGS. 1 to 6, flanges 25 and 33; in FIG. 6A, flange 51; in FIGS. 7 to 11, flanges 66 and 97; and in FIGS. 12 to 16, flanges 139 and 160. These flanges are intended to position the elements axially in a related housing and conveniently are formed to extend as radially extending members, continuous round the periphery of the related element. However, they need not extend for the complete periphery. For example they can be radially extending fingers or formations extending for only part of the periphery of an element. More than one such radially extending member may be provided on an element.

While shown as being formed by folding of an element when of thin tubular construction, or as a solid member in the machined or otherwise formed element, radially extending members can be formed by other methods. Thus, in a thin walled tubular element, part of the wall can be sheared and bent outwards from the tubular element. Other ways of forming radially extending members can readily be appreciated.

A further alternative is for a separate member to be attached to the tubular element. A sleeve with one or more radially extending members, on a complete peripherally extending member, can be slid on to the tubular member. The sleeve can be retained in its correct position by a detent, by bonding, or other means.

Connecting elements can also be produced by molding, and the radially extending members can be formed as the element is molded.

The attachment of connector subassemblies to the related cables can be of varying forms. One example is illustrated in FIG. 7, but the actual form will depend on performance requirements and cable construction. The attachment should provide effective sealing and prevent any strains being applied to individual fibres, strains being transferred from the cable to the connector housing. Typically the cable will include members which give tensile and bending strength to the cable. Such strength members are suitably terminated at or within the terminating structure, for example the housing 80, FIG. 7. Thus for example in connecting one cable to another, tensile and bending loads on one cable are transmitted via the housing 80 to the connector housing 63, then to connector housing 90 and finally to a housing, similar to housing 80, on the other cable. This avoids, or reduces to a minimum, transfer of loads to the fibres.

As used herein, the terminology "pair of fibres" is intended to mean a related pair of optical fibres joined, or to be joined, in end-to-end relationship.

What is claimed is:

1. A connector for releasably connecting at least one pair of single optical fibres in abutting end-to-end relationship, said fibres including a plastic coating, comprising two subassemblies and means for releasably retaining the assemblies in assembled relationship;
    one of said subassemblies including at least one tubular connecting element having a bore at a rear portion which bore is a close sliding fit on a coated portion of one of said pair of coated fibres and a bore at a forward portion a close sliding fit on uncoated ends of both of said pair of fibres in end-to-end relationship, and a divergent surface at each end of said bore at said forward portion;
    the other of said subassemblies including at least one tubular member having a bore at a rear portion a close sliding fit on a coated portion of the other of said pair of coated fibres, and a bore at a forward portion for reception of one of said tubular connecting elements of said one subassembly.

2. A connector as claimed in claim 1, said tubular connector element including a preformed forward section, said preformed section comprising a plurality of radially inwardly deformed portions defining a plurality of lobes and a central bore of a diameter a close sliding fit on said uncoated fibres.

3. A connector as claimed in claim 1, including at least one radially extending member on said tubular connecting member at a position intermediate the ends of said tubular connecting member.

4. A connector as claimed in claim 1, including at least one radially extending member on said tubular member at a position intermediate the ends of said tubular member.

5. A connector as claimed in claim 2, said tubular connecting element a thin walled tube, and including at least one integral preformed radially extending member intermediate the ends of said tubular connecting element.

6. A connector as claimed in claim 2, said other of said subassemblies including a thin wall tubular element in the rear portion of said tubular member, the bore of said thin walled element a close sliding fit on said coated fibre, said tubular element including at least one integral preformed radially extending member at a position intermediate the ends of the tubular element.

7. A connector for simultaneously releasably connecting a plurality of pairs of single optical fibres in opposed end-to-end relationship, said fibres including a plastic coating, including first and second subassemblies;
    said first subassembly comprising a housing and a plurality of tubular members in said housing, each tubular member having a rear bore of a size to be a close sliding fit on a coated fibre and a forward bore of a size to receive a connector element in said second subassembly;
    said second subassembly comprising a housing and a plurality of tubular connecting elements, each element having a rear bore of a size to be a close sliding fit on a coated fibre, a forward bore of a size to be a close sliding fit on the uncoated ends of a pair of fibres, and a divergent surface at each end of said forward bore, and of an external size to be a close sliding fit in said forward bore of one of said tubular members of said first subassembly;
    means for releasably retaining said tubular members in said housing of said first subassembly;
    means for releasably retaining said tubular connecting elements in said housing of said second subassembly;
    means for releasably retaining said first and second subassemblies in a cooperating assembled position with each of said tubular connecting elements in a related forward bore of a said tubular member, the arrangement such that with a coated optical fibre in each of a related pair of tubular member and connector elements the ends of the fibres are in end-to-end relationship at a position approximately in a mid portion of said forward bore of the tubular connector element.

8. A connector as claimed in claim 7, including at least one radially extending member on each of said tubular members, and resilient means between each of said radially extending members and the related housing, for limited axial movement of said tubular members.

9. A connector as claimed in claim 7, including at least one radially extending member on each of said tubular connecting elements and resilient means between each of said radially extending members and the related housing, for limited axial movement of said tubular connecting elements.

10. A connector as claimed in claim 8, each of said tubular members a thin walled tube, said radially extending members comprising an integral preformed flange.

11. A connector as claimed in claim 9, each of said tubular connecting elements a thin walled tube, said radially extending member comprising a preformed flange.

12. A connector as claimed in claim 6, including a datum surface on each of said tubular members and a datum surface on each of said tubular connecting elements, said datum surfaces on a related pair of tubular member and connector element in contact on assembly of said two subassemblies together.

13. A connector as claimed in claim 8, said means for releasably retaining said tubular members engaged with said radially extending members in opposition to said resilient means on initial assembly of said first subassembly.

14. A connector as claimed in claim 9, said means for releasably retaining said tubular connecting elements engaged with said radially extending members in opposition to said resilient means on initial assembly of said second subassembly.

15. A connector as claimed in claim 7, for releasably connecting optical fibres in a cable to further optical fibres; in pairs in opposed end-to-end relationship, including cable clamping means on the related housing.

* * * * *